(12) United States Patent
Cheng

(10) Patent No.: US 11,914,234 B2
(45) Date of Patent: Feb. 27, 2024

(54) TOUCH PANEL AND TOUCH DISPLAY DEVICE

(71) Applicant: HUIZHOU CHINA STAR OPTOELECTRONICS TECHNOLOGY CO., LTD., Guangdong (CN)

(72) Inventor: Chingyuan Cheng, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 600 days.

(21) Appl. No.: 17/041,555

(22) PCT Filed: Jul. 17, 2020

(86) PCT No.: PCT/CN2020/102834
§ 371 (c)(1),
(2) Date: Sep. 25, 2020

(87) PCT Pub. No.: WO2021/248634
PCT Pub. Date: Dec. 16, 2021

(65) Prior Publication Data
US 2023/0147590 A1    May 11, 2023

(30) Foreign Application Priority Data

Jun. 12, 2020 (CN) .......................... 202010536576.5

(51) Int. Cl.
*G02F 1/13* (2006.01)
*G02F 1/1333* (2006.01)
(Continued)

(52) U.S. Cl.
CPC ........ *G02F 1/1323* (2013.01); *G02F 1/13338* (2013.01); *G02F 1/133512* (2013.01);
(Continued)

(58) Field of Classification Search
CPC .............. G02F 1/1323; G02F 1/13338; G02F 1/133512; G02F 1/133531; G02F 1/1396; G02F 1/133331; G06F 3/0412
(Continued)

(56) References Cited

U.S. PATENT DOCUMENTS 10,649,248 B1 * 5/2020 Fan Jiang .............. H04N 7/141
2005/0190329 A1 * 9/2005 Okumura .............. G02F 1/1323
349/123
(Continued)

FOREIGN PATENT DOCUMENTS

CN    108169953 A    6/2018
CN    108196391 A    6/2018
(Continued)

*Primary Examiner* — Charles S Chang

(57) ABSTRACT

A touch panel and a touch display device are provided. The touch panel includes a display module and a package cover plate. The display module includes a display screen and a first polarizer placed on a side of the display screen. A first frame glue is placed between the package cover plate and the display module, and the first frame glue, the package cover plate and the display module form a cavity. A first liquid crystal is filled in the cavity. The first liquid crystal includes a plurality of first liquid crystal molecules, and orthogonal projections of light axes of some of the first liquid crystal molecules intersect a polarization direction of the first polarizer.

18 Claims, 8 Drawing Sheets

(51) Int. Cl.
    *G02F 1/1335* (2006.01)
    *G02F 1/139* (2006.01)
    *G06F 3/041* (2006.01)

(52) U.S. Cl.
    CPC ...... *G02F 1/133531* (2021.01); *G02F 1/1396* (2013.01); *G06F 3/0412* (2013.01); *G02F 1/133331* (2021.01); *G02F 2202/28* (2013.01)

(58) Field of Classification Search
    USPC .......................................................... 349/12
    See application file for complete search history.

(56) References Cited

U.S. PATENT DOCUMENTS

| | | | |
|---|---|---|---|
| 2006/0262057 A1* | 11/2006 | Sumiyoshi | G09G 3/3614 345/87 |
| 2017/0148702 A1* | 5/2017 | Funayama | G06F 3/0445 |
| 2020/0285108 A1 | 9/2020 | Saitoh et al. | |

FOREIGN PATENT DOCUMENTS

| | | |
|---|---|---|
| CN | 108363250 A | 8/2018 |
| CN | 110068946 A | 7/2019 |
| CN | 111025733 A | 4/2020 |
| CN | 111061078 A | 4/2020 |
| CN | 111123562 A | 5/2020 |
| WO | 2019103012 A1 | 5/2019 |

\* cited by examiner

TOUCH PANEL AND TOUCH DISPLAY DEVICE

FIELD OF THE INVENTION

The present invention relates to a display technique, and more particularly, to a touch panel and a touch display device.

BACKGROUND

In general, the touch display device has a wide view angle such that multiple viewers could watch the touch display device at the same time. However, in some scenarios, the wide angle may introduce some issues. For example, when a user is viewing a private website/information or inputting a password, the wide angle may allow another user to know the confidential information. For the privacy reason, a privacy protection film is also positioned in front of the display to reduce the view angle by filtering out large-angle light.

As shown in FIG. 1, the conventional privacy protection film 10 adopts the shutter mechanism. That is, the privacy protection film 10 has a shutter structure, which comprises a plurality of parallel grids 11. The light could pass through the gaps 12 between two adjacent grids 11. Through adjusting the shape of the grids 11 and the size of the gaps 12, the large-angle light could be filtered out.

However, the conventional privacy protection film 10 has a certain thickness and thus increases the entire thickness of the display device. In this way, the user experience is reduced.

SUMMARY

The conventional privacy protection film 10 has a certain thickness and thus increases the entire thickness of the display device. In this way, the user experience is reduced. One objective of an embodiment of the present invention is to provide a touch panel and a touch display device to solve the above issue.

According to an embodiment of the present invention, a touch panel is disclosed. The touch panel comprises: a display module, a package cover plate, placed on a light-emitting side of the display module. The display module comprises a display screen and a first polarizer placed on a side of the display screen, which is close to the package cover plate. A first frame glue is placed between the package cover plate and the display module, and the first frame glue, the package cover plate and the display module form a cavity. A first liquid crystal (LC) is filled in the cavity; the first liquid crystal comprises a plurality of first liquid crystal molecules, and orthogonal projections of light axes of some of the first liquid crystal molecules intersect a polarization direction of the first polarizer.

In some embodiments of the present disclosure, the orthogonal projections of the light axes of some of the first liquid crystal molecules are perpendicular to the polarization direction of the first polarizer.

In some embodiments of the present disclosure, a second polarizer is placed on a side of the package cover plate, which is comparatively far from the display module, and a polarization direction of the second polarizer is perpendicular to the polarization direction of the first polarizer.

In some embodiments of the present disclosure, a first alignment film layer is placed between the display module and the first LC. A second alignment film layer is placed between the first LC and the package cover plate. The first alignment film layer and the second alignment film are oppositely arranged.

In some embodiments of the present disclosure, a first electrode layer is placed between the display module and the first LC. A second electrode layer is placed between the first LC and the package cover plate.

In some embodiments of the present disclosure, the display module further comprises a touch layer placed on a side of the display screen, which is close to the package cover plate.

In some embodiments of the present disclosure, the touch layer is placed between the display screen and the package cover plate. The first polarizer is placed between the touch layer and the package cover plate. The first frame glue, the package cover plate and the touch layer form the cavity.

In some embodiments of the present disclosure, the display module further comprises a third polarizer placed on a side of the package cover plate, which is comparatively far away from the display screen. A polarization direction of the third polarizer is perpendicular to the polarization direction of the first polarizer.

In some embodiments of the present disclosure, a light blocking layer is placed at an edge of the package cover plate, and an orthogonal projection of the light blocking layer on the package cover plate covers an orthogonal projection of the first frame glue on the package cover plate.

According to an embodiment of the present invention, a touch display device is disclosed. The touch display device comprises a backlight module and a touch panel. The backlight module is placed on a back side of the touch panel. The touch panel comprises: a display module; a package cover plate, placed on a light-emitting side of the display module; wherein the display module comprises a display screen and a first polarizer placed on a side of the display screen, which is close to the package cover plate; wherein a first frame glue is placed between the package cover plate and the display module, and the first frame glue, the package cover plate and the display module form a cavity; a first liquid crystal (LC) is filled in the cavity; the first liquid crystal comprises a plurality of first liquid crystal molecules, and orthogonal projections of light axes of some of the first liquid crystal molecules intersect a polarization direction of the first polarizer.

In some embodiments of the present disclosure, the orthogonal projections of the light axes of some of the first liquid crystal molecules are perpendicular to the polarization direction of the first polarizer.

In some embodiments of the present disclosure, a second polarizer is placed on a side of the package cover plate, which is comparatively far from the display module, and a polarization direction of the second polarizer is perpendicular to the polarization direction of the first polarizer.

In some embodiments of the present disclosure, a first alignment film layer is placed between the display module and the first LC. A second alignment film layer is placed between the first LC and the package cover plate. The first alignment film layer and the second alignment film are oppositely arranged.

In some embodiments of the present disclosure, a first electrode layer is placed between the display module and the first LC. A second electrode layer is placed between the first LC and the package cover plate.

In some embodiments of the present disclosure, the display module further comprises a touch layer placed on a side of the display screen, which is close to the package cover plate.

In some embodiments of the present disclosure, the touch layer is placed between the display screen and the package cover plate. The first polarizer is placed between the touch layer and the package cover plate. The first frame glue, the package cover plate and the touch layer form the cavity.

In some embodiments of the present disclosure, the display module further comprises a third polarizer placed on a side of the package cover plate, which is comparatively far away from the display screen. A polarization direction of the third polarizer is perpendicular to the polarization direction of the first polarizer.

In some embodiments of the present disclosure, a light blocking layer is placed at an edge of the package cover plate, and an orthogonal projection of the light blocking layer on the package cover plate covers an orthogonal projection of the first frame glue on the package cover plate.

In some embodiments of the present disclosure, an orthogonal projection of the display module on the package cover plate lies in the package cover plate.

In some embodiments of the present disclosure, the first frame glue is placed at an edge of the display module and surrounding a lighting area of the display module.

The first liquid crystal (LC) is filled in the cavity and is used to adjust the polarization direction and the transmission direction of the incident light. Light with different incident angles will be differently changed by the first LC such that the light with larger incident angle could be filtered out to protect the privacy. In contrast to the privacy protection film, the first LC could achieve the same purpose without increasing the thickness of the display device. Furthermore, when the user is viewing the touch panel, the luminance of the outgoing light will not be enormously reduced and the color will not be distorted. Thus, the user experience could be raised.

BRIEF DESCRIPTION OF THE DRAWINGS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

REFERENCE SIGNS OF ELEMENTS

10 protection film; 11 grid; 12 gap; 20 touch panel; 21 display module; 211 display screen; 211a array substrate; 211b color film substrate; 211c second frame glue; 211d second LC; 212 first polarizer; 213 third polarizer; 214 optical glue; 215 touch layer; 22 package cover plate; 23 first frame glue; 24 cavity; 25 first LC; 261 first alignment film layer; 262 second alignment film layer; 271 first electrode layer; 272 second electrode layer; 273 third electrode layer; 274 fourth electrode layer; 28 second polarizer; 29 light blocking layer; 31 incident light; 32 outgoing light; 40 backlight module.

DETAILED DESCRIPTION OF PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The conventional privacy protection film 10 has a certain thickness and thus increases the entire thickness of the display device. In this way, the user experience is reduced. One objective of an embodiment of the present invention is to solve the above issue.

Embodiment 1

Figure 1:
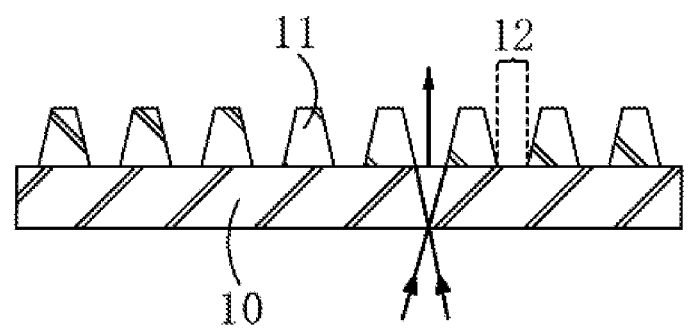
FIG. 1 is a diagram of a conventional privacy protection film.
Figure 2:
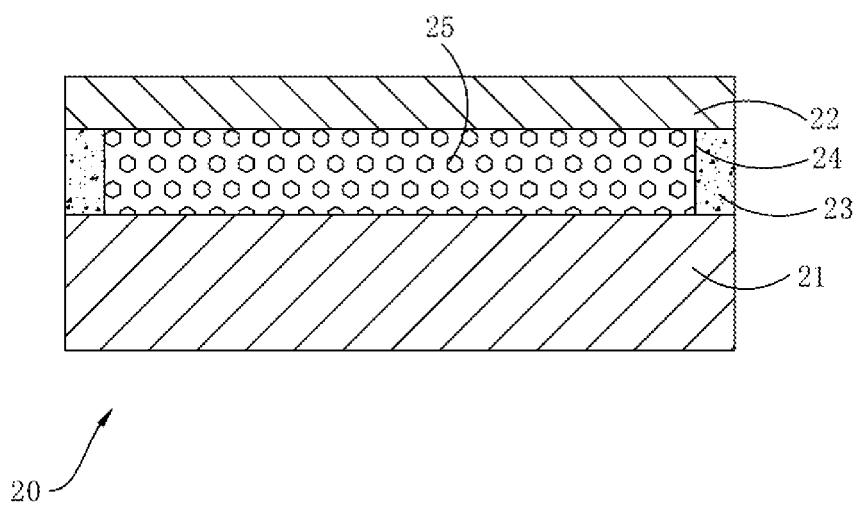
FIG. 2 is a diagram of a touch panel of a first structure according to the first embodiment of the present invention.

As shown in FIG. 2, the touch panel 20 comprises a display module 21 and a package cover plate 22. The package cover plate 22 is placed on a light-emitting side of the display module 21.

The display module 21 could be an LCD module 21. The package cover plate 22 could be a transparent plastic cover plate or a transparent glass cover plate. The orthogonal projection of the display module 21 on the package cover plate 22 lies in the package cover plate 22. That is, the size of the package cover plate 22 is larger than the size of the display module 21. The package cover plate 22 is used to protect the display module 21 from being squeezed or hit and moisture.

The first frame glue 23 is placed between the package cover plate 22 and the display module 21. The first frame glue 23 is placed at the edge of the display module 21 and surrounding the lighting area of the display module. In contrast to apply the optical glue to the entire surface of the package cover plate 22 to paste the package cover plate 22 on the display module 21, the manufacturing process in this embodiment is more mature and the operation is more simple. Furthermore, the first frame glue 23, the package cover plate 22 and the display module 22 form a cavity 24 and the first liquid crystal (LC) 25 is filled in the cavity. This could prevent the package cover plate 22 from sinking into the cavity 24 due to the atmospheric pressure.

Figure 3:
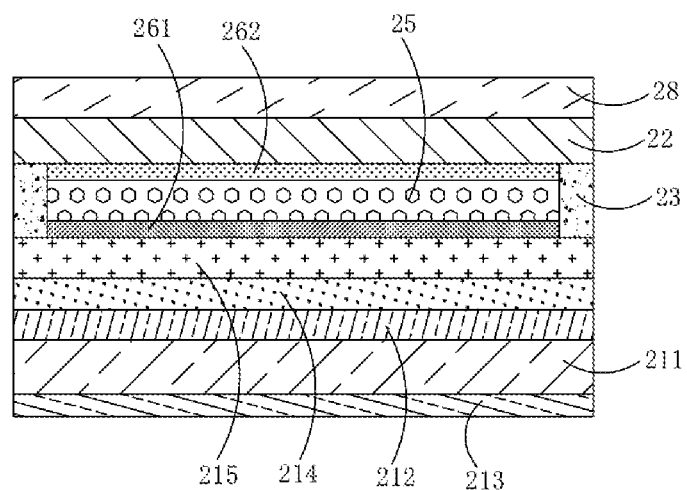
FIG. 3 is a diagram of a touch panel of a second structure according to the first embodiment of the present invention.

As shown in FIG. 3, the display module 21 comprises a display screen 211 and a first polarizer 212 placed on a side of the display screen 211, where the side is comparatively close to the package cover plate 22. The first LC 25 has a first state. When the first LC 25 is in the first state, the orthogonal projections of light axes of at least some of the first LC molecules on the first polarizer 212 are perpendicular to the polarization direction of the first polarizer 212.

The first LC 25 could comprise twisted nematic (TN) liquid crystals. Through filling the first LC 25 in the cavity 24, the first LC 25 could be used to adjust the polarization direction and the transmission direction of the incident light. In this way, light with different incident angles will be differently adjusted such that the outgoing light of the display module 21, which has a larger outgoing angle, could be filtered out to achieve the privacy protection. In contrast to the display panel using the conventional privacy protection film, filling the first LC 25 into the cavity 24 to achieve the same privacy protection does not increase the thickness of the touch display device. Furthermore, when the user is viewing the touch panel 20 (for example, the angle between the viewing direction of the user and the normal direction of the touch panel is equal to or less than 10 degrees), the luminance of the outgoing light of the touch panel 20 will not be enormously reduced and the color will not be distorted. Thus, the user experience could be raised.

The first LC 25 could comprise twisted nematic (TN) liquid crystals. The TN liquid crystals have the polarization rotation characteristic, which is used to adjust the polarization direction of the first outgoing light of the display module. Furthermore, light passing through the first LC 25 with different incident angles will have different degrees of phase delays and thus the outgoing light corresponding to the incident light will be differently adjusted. In this way, the first LC 25 could be determined to filter out the first outgoing light having larger outgoing angle, of the display module, such that the privacy protection could be accomplished.

When the first LC 25 comprises the TN liquid crystals, the orthogonal projections of light axes of at least some of the first LC molecules on the first polarizer 212 are perpendicular to the polarization direction of the first polarizer 212.

The refractive index of the liquid crystal changes according to its direction such that the variance of the polarization direction of the incident light of the first LC 25 is related to the distribution of the liquid crystal molecules. In this way, the outgoing light of the first LC 25 has different transmission routes. Because the twisting pitch of the TN LC molecule is much larger than the wavelength of the outgoing light of the display module 21, when the light axes of some of the LC molecules are perpendicular to the polarization direction of the first polarizer 212 within the same plane, the polarization direction of the incident light will be rotated by 90 degrees by the first LC 25. Therefore, the better privacy protection could be achieved.

When the first LC comprises the TN liquid crystals, a second polarizer 28 could be further placed on a side of the package cover plate 22, where the side is comparatively far away from the display module 21. The polarization direction of the second polarizer 28 is perpendicular to the polarization direction of the first polarizer 212.

The polarization direction of the outgoing light of the display module 21 will be rotated by 90 degrees after passing through the LC molecules of the first LC 25. At this time, the polarization direction of the outgoing light is perpendicular to the polarization direction of the first polarizer 212. The second polarizer 28 could be used to analyze the light passing through the first LC 25. The light having the same polarization direction of the second polarizer 28 is able to pass through the second polarizer 28. The light having different polarization directions from the polarization direction of the second polarizer 28 will be blocked by the second polarizer 28 to prevent the light from influencing the normal display of the touch panel 20.

The second polarizer 28 is a linear polarizer. The ambient light is basically similar to the circularly polarized light. When the ambient light tries to pass through the second polarizer 28, about a half of the ambient light will be blocked by the second polarizer 28. This means that only a part of the ambient light could pass through the second polarizer 28 and enters the cavity 24. The passing ambient light is reflected between the package cover plate 22 and the display module 21. By using the second polarizer 28 to reduce the amount of ambient light entering the cavity 24, the user may not view a whitening phenomenon on the touch panel 20 when the user views the touch panel 20 in a reflecting view angle (such as a large view angle). Thus, this increases the viewable angle of the touch panel and raises the user experience.

The first LC 25 could comprise Polymer Dispersed Liquid Crystal (PDLC). The PDLC could perform a scattering operation on the incident light of the first LC 25 to change the transmission direction of the incident light. Thus, by arranging the distribution of the first LC molecules, the light having a larger view angle could be shifted to the central area of the touch panel. In this way, the privacy protection could be accomplished as well.

The display module 21 further comprises a third polarizer 213. The third polarizer 213 is placed on a side of the package cover plate 22, where the side is comparatively far away from the display screen 211. The polarization direction of the first polarizer 212 is perpendicular to the polarization direction of the third polarizer 213. The third polarizer 213 is used to convert the light generated by the light source of the touch panel 20 into the polarized light.

The display module 21 further comprises a touch layer 215 placed on a side of the package cover plate 22, where the side is comparatively close to the display screen 211 such that the touch panel 20 has the touch control function.

The touch layer 215 could comprise one or more types of capacitor-type touch sensing components, resistor-type touch sensing components, acoustics-type touch sensing components, mechanic-type touch sensing components, and optical-type touch sensing components. The touch layer 215 could be pasted on the display screen 212 through the frame glue frame. The touch layer 215 could be totally pasted on display screen 211 through the optical glue 214.

The touch layer 215 is placed between the display screen 211 and the package cover plate 22. The first frame glue 23, the package cover plate 22 and the touch layer 215 form the cavity 24. The first polarizer 212 is placed between the touch layer 215 and the package cover plate 22 to prevent the first polarizer 212 from influencing the sensitivity of the touch layer 215.

The first alignment film layer 261 is placed on a side of the display module 12, where the side is comparatively close to the package cover plate 22. The second alignment film layer 262 is placed on a side of the package cover plate 22, where the side is comparatively close to the display module 21. The first alignment film layer 261 and the second alignment film layer 262 are oppositely arranged.

When the first LC 25 is formed, the first alignment film layer 261 and the second alignment film layer 262 could be used to arrange the LC molecules of the first LC 25 in a specific direction such that the LC molecules of the first LC 25 could be always distributed in the specific direction. In this way, the touch panel 20 is always in the privacy-protection mode.

Figure 4:
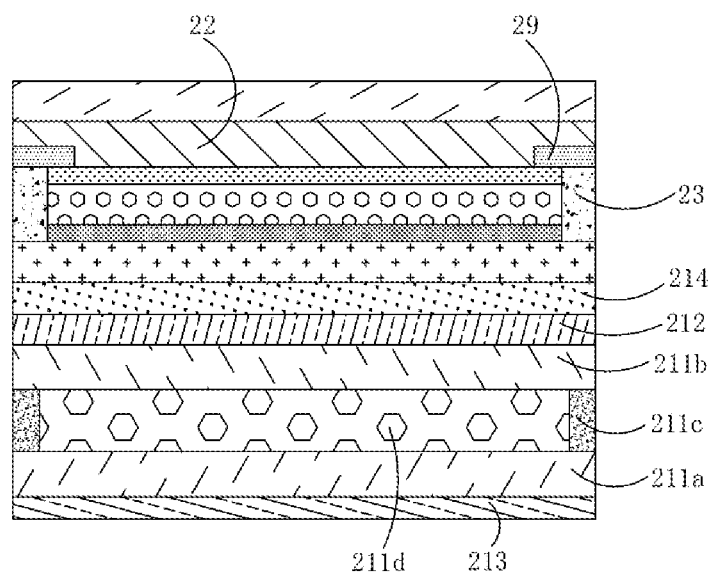
FIG. 4 is a diagram of a touch panel of a third structure according to the first embodiment of the present invention.

As shown in FIG. 4, the display screen 211 comprises an array substrate 211a and a color film substrate 211b. The array substrate 211a and the color film substrate 211b are oppositely arranged. A second frame glue 211c is placed between the array substrate 211a and the color film substrate 211b. The second frame glue 211c, the array substrate 211a and the color film substrate 211b form a storage cavity. A second LC 211d is placed in the storage cavity.

The first polarizer 212 is placed on a side of the array substrate 211a, where the side is comparatively far away from the color film substrate 211b. The third polarizer 211 is placed on a side of the color film substrate 211b, where the side is comparatively far away from the array substrate 211a.

The materials of the first frame glue 22 and the second frame glue 211c could be the same or different. The orthogonal projection of the first frame glue 23 on the second frame glue 211c lies in the second frame glue 211. This could prevent the second frame glue 211c from influencing the normal display of the touch panel 20.

The materials of the second LC 211d and the first LC 25 could be the same or different.

A light blocking layer 29 is placed at the edge of the package cover plate 22. The orthogonal projection of the light blocking layer 29 on the package cover plate 22 covers the orthogonal projection of the first frame glue 23 on the package cover plate 22 to prevent the leakage light at the edge.

Figure 5:
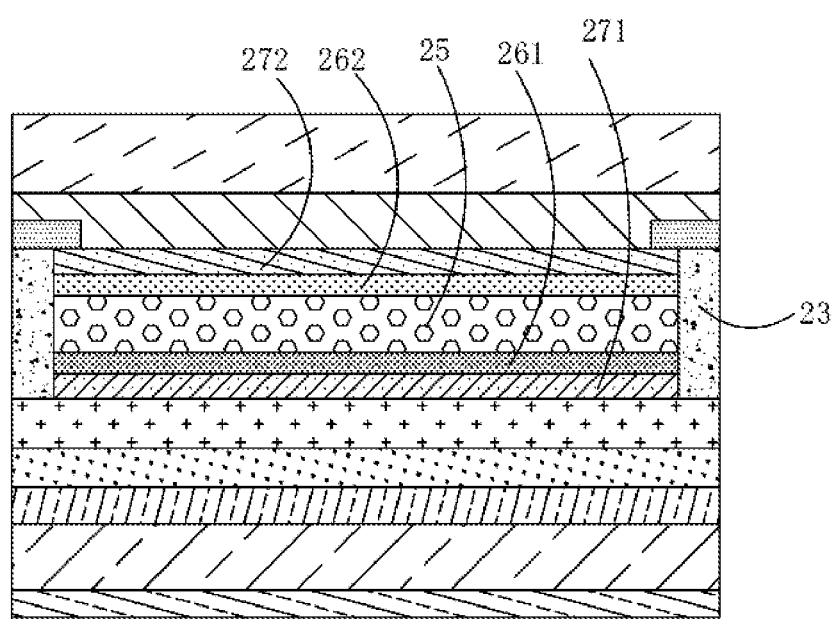
FIG. 5 is a diagram of a touch panel according to the second embodiment of the present invention.

As shown in FIG. 5, a first electrode layer 271 is placed between the display module 21 and the first LC 25. A second electrode layer 272 is placed between the package cover plate 22 and the first LC 25.

The materials of the first electrode layer 271 and the second electrode layer 272 could be metal oxide or any other transparent conductive material.

The electric field between the first electrode layer 271 and the second electrode layer 272 could be used to rotate the LC molecules to arrange the first LC molecules of the first LC 25 distribute according to different angles. In this way, the touch panel 20 could be easily switched between the large-view-angle mode (for example, the angle between the viewing direction of the user and the normal direction of the touch panel is larger than or equal to 40 degrees and the user could still clearly view the image shown on the touch panel 20) and the privacy protection mode (for example, the angle between the viewing direction of the user and the normal direction of the touch panel is equal to or less than 10 degrees and the user cannot view the display image on the touch panel 20) without installing or removing the privacy protection film. This is more efficient and convenient and is more easily used in the full-screen touch panel.

Furthermore, the first alignment film layer 261 could be placed on the display module 21 and the second alignment film layer 262 is placed on the package cover plate 22. Or, the first alignment film layer 261 and the second alignment film layer 262 do not need to be used.

Under the condition that the first alignment film layer 261 could be placed on the display module 21 and the second alignment film layer 262 is placed on the package cover plate 22, the first alignment film layer 261 covers the first electrode layer 271 and the second alignment film layer 262 covers the second electrode layer 272.

In an embodiment, the first LC 25 comprises the TN LC. When the user needs to use the large-view-angle mode of the touch panel 20, the first electrode layer 271 and the second electrode layer 272 are powered. The LC molecules in the first LC 25 are distributed according to the electric field between the first electrode layer 271 and the second electrode layer 272. The light axes of all the first LC molecules are perpendicular to the surface of the touch panel 20. The first LC loses its optical rotation function and the outgoing light from the display module 21 follows its original route to pass through the first LC 25. At this time, the view angle of the touch panel 20 is larger. When the user needs to use the privacy protection mode of the touch panel 20, the first electrode layer 271 and the second electrode layer 272 are not powered. The LC molecules in the first LC 25 are distributed according to predetermined angles. The polarization direction of the outgoing light from the display module 21 is rotated when the outgoing light passes through the first LC such that the touch panel 20 enters the privacy protection mode.

Figure 6:
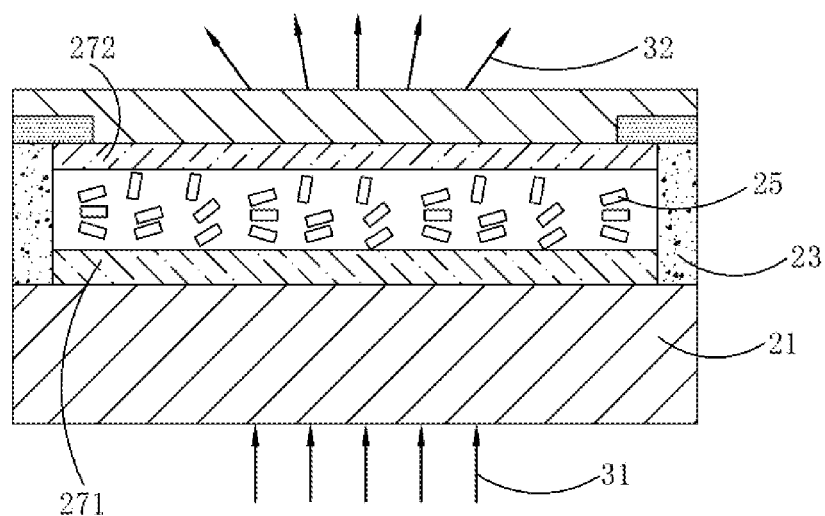
FIG. 6 is a diagram of a touch panel when the touch panel is in a large view angle mode according to the second embodiment of the present invention.

In another embodiment, the first LC comprises PDLC. As shown in FIG. 6, when the user needs to use the large-view-angle mode of the touch panel 20, the first electrode layer 271 and the second electrode layer 272 are not powered. Without any applied voltage, the light axis of each of the first LC molecules is distributed in its prioritized trend. That is, the light axes of all the first LC molecules are distributed in disorder and at least the light axes of some of the first LC molecules are different. Because the PDLC is a dielectric anisotropy material, the incident light 31 incident into the first LC 25 will be scattered and become outgoing light 32 direct to different directions. This increases the luminance view angle of the touch panel 20 and thus makes the touch panel 20 enter the large-view-angle mode.

Figure 7:
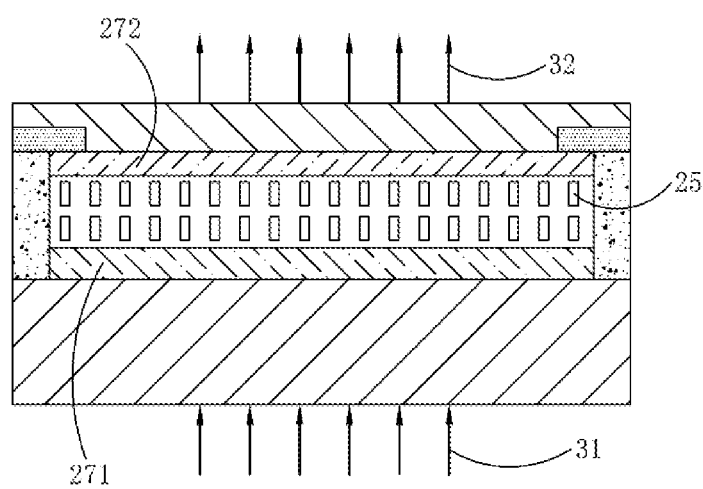
FIG. 7 is a diagram of a touch panel when the touch panel is in a privacy protection mode according to the second embodiment of the present invention.

As shown in FIG. 7, when the user needs to use the privacy protection mode of the touch panel 20, the first electrode layer 271 and the second electrode layer 272 are powered. The LC molecules in the first LC 25 are orderly distributed according to the electric field and the light axes of all the LC molecules along the electric field. After the incident light 31 into the first LC 25 passes through the first LC 25, the route of the outgoing light 25 is parallel to the route of the incident light 31. At this time, the view angle of the touch panel 20 is small and thus the touch panel 20 enters the privacy protection mode.

Under the condition that the first LC 25 comprises PDLC, the PDLC could be set to be arranged in predetermined angles when the first electrode layer 271 and the second electrode layer 272 are not powered. This makes the light having a large view angle is deflected toward to the center area of the touch panel 20 after passing through the first LC 25 such that the touch panel 20 enters the privacy protection mode. Furthermore, when the first electrode layer 271 and the second electrode layer 272 are powered, the luminance view angle of the touch panel 20 is larger and thus the touch panel 20 enters the large-view-angle mode.

The first liquid crystal (LC) 25 is filled in the cavity 24 and is used to adjust the polarization direction and the transmission direction of the incident light. Light with different incident angles will be differently changed by the first LC 25 such that the light with larger incident angle could be filtered out to protect the privacy. In contrast to the privacy protection film, the first LC could achieve the same purpose without increasing the thickness of the display device. Furthermore, when the user is viewing the touch panel 20, the luminance of the outgoing light will not be enormously reduced and the color will not be distorted. Thus, the user experience could be raised.

Figure 8:
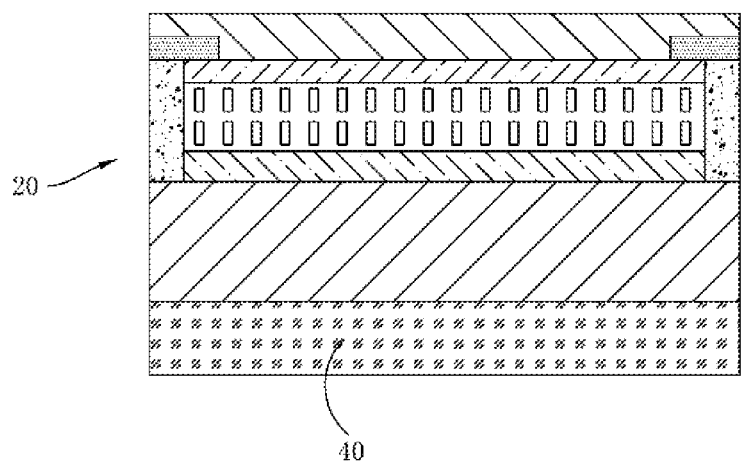
FIG. 8 is a diagram of a touch display device according to an embodiment of the present invention.

Based on the above-mentioned touch panel 20, a touch display device is disclosed. As shown in FIG. 8, the touch display device comprises a backlight module 40 and a touch panel 20 according to any one of the above-mentioned embodiments. The backlight module 40 is placed on the back side of the touch panel 20.

Above are embodiments of the present invention, which does not limit the scope of the present invention. Any modifications, equivalent replacements or improvements within the spirit and principles of the embodiment described above should be covered by the protected scope of the invention. In addition, the above embodiments might have different focuses and thus might not be illustrated in details. For those not illustrated in details, a person having ordinary skills in the art could refer to any related description regarding another embodiment.

What is claimed is:

1. A touch panel, comprising:
a display module;
a package cover plate, placed on a light-emitting side of the display module;
a second polarizer, placed on a side of the package cover plate, which is comparatively far from the display module;
wherein the display module comprises a display screen and a first polarizer placed on a side of the display screen, which is close to the package cover plate;
wherein a first frame glue is placed between the package cover plate and the display module, and the first frame glue, the package cover plate and the display module form a cavity; a first liquid crystal (LC) is filled in the cavity; the first liquid crystal comprises a plurality of first liquid crystal molecules, and orthogonal projections of light axes of some of the first liquid crystal molecules intersect a polarization direction of the first polarizer;
wherein a polarization direction of the second polarizer is perpendicular to the polarization direction of the first polarizer,
wherein a twisting pitch of the first liquid crystal is much larger than a wavelength of light of the display module.

2. The touch panel of claim 1, wherein the orthogonal projections of the light axes of some of the first liquid crystal molecules are perpendicular to the polarization direction of the first polarizer.

3. The touch panel of claim 1, wherein a first alignment film layer is placed between the display module and the first LC; a second alignment film layer is placed between the first LC and the package cover plate; and the first alignment film layer and the second alignment film are oppositely arranged.

4. The touch panel of claim 1, wherein a first electrode layer is placed between the display module and the first LC; and a second electrode layer is placed between the first LC and the package cover plate.

5. The touch panel of claim 1, wherein the display module further comprises a touch layer placed on a side of the display screen, which is close to the package cover plate.

6. The touch panel of claim 5, wherein the touch layer is placed between the display screen and the package cover plate; the first polarizer is placed between the touch layer and the package cover plate; and the first frame glue, the package cover plate and the touch layer form the cavity.

7. The touch panel of claim 1, wherein the display module further comprises:

a third polarizer placed on a side of the package cover plate, which is comparatively far away from the display screen;
wherein a polarization direction of the third polarizer is perpendicular to the polarization direction of the first polarizer.

8. The touch panel of claim 1, wherein a light blocking layer is placed at an edge of the package cover plate, and an orthogonal projection of the light blocking layer on the package cover plate covers an orthogonal projection of the first frame glue on the package cover plate.

9. A touch display device, comprising a backlight module and a touch panel, the backlight module placed on a back side of the touch panel, the touch panel comprising:
a display module;
a package cover plate, placed on a light-emitting side of the display module;
a second polarizer, placed on a side of the package cover plate plat, which is comparatively far from the display module;
wherein the display module comprises a display screen and a first polarizer placed on a side of the display screen, which is close to the package cover plate;
wherein a first frame glue is placed between the package cover plate and the display module, and the first frame glue, the package cover plate and the display module form a cavity; a first liquid crystal (LC) is filled in the cavity; the first liquid crystal comprises a plurality of first liquid crystal molecules, and orthogonal projections of light axes of some of the first liquid crystal molecules intersect a polarization direction of the first polarizer;
wherein a polarization direction of the second polarizer is perpendicular to the polarization direction of the first polarizer,
wherein a twisting pitch of the first liquid crystal is much larger than a wavelength of light of the display module.

10. The touch display device of claim 9, wherein the orthogonal projections of the light axes of some of the first liquid crystal molecules are perpendicular to the polarization direction of the first polarizer.

11. The touch display device of claim 9, wherein a first alignment film layer is placed between the display module and the first LC; a second alignment film layer is placed between the first LC and the package cover plate; and the first alignment film layer and the second alignment film are oppositely arranged.

12. The touch display device of claim 9, wherein a first electrode layer is placed between the display module and the first LC; and a second electrode layer is placed between the first LC and the package cover plate.

13. The touch display device of claim 9, wherein the display module further comprises a touch layer placed on a side of the display screen, which is close to the package cover plate.

14. The touch display device of claim 13, wherein the touch layer is placed between the display screen and the package cover plate; the first polarizer is placed between the touch layer and the package cover plate; and the first frame glue, the package cover plate and the touch layer form the cavity.

15. The touch display device of claim 9, wherein the display module further comprises:
a third polarizer placed on a side of the package cover plate, which is comparatively far away from the display screen;

wherein a polarization direction of the third polarizer is perpendicular to the polarization direction of the first polarizer.

16. The touch display device of claim 9, wherein a light blocking layer is placed at an edge of the package cover plate, and an orthogonal projection of the light blocking layer on the package cover plate covers an orthogonal projection of the first frame glue on the package cover plate.

17. The touch display device of claim 9, wherein an orthogonal projection of the display module on the package cover plate lies in the package cover plate.

18. The touch display device of claim 9, wherein the first frame glue is placed at an edge of the display module and surrounding a lighting area of the display module.

* * * * *